(12) United States Patent
Narasimhan et al.

(10) Patent No.: US 11,663,643 B2
(45) Date of Patent: *May 30, 2023

(54) METHOD, MACHINE-READABLE MEDIUM, AND SYSTEM FOR PROXIMITY-BASED SERVICES FOR PRODUCTS BASED ON MERCHANT DENSITY

(71) Applicant: eBay Inc., San Jose, CA (US)

(72) Inventors: Lakshmi Narasimhan, Bangalore (IN); Saikrishna Vaidyanathan, Bangalore (IN); Muthukumar Ramasamymadasamy, Bangalore (IN)

(73) Assignee: EBAY INC., San Jose, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 17/143,829

(22) Filed: Jan. 7, 2021

(65) Prior Publication Data

US 2021/0241339 A1    Aug. 5, 2021

Related U.S. Application Data

(63) Continuation of application No. 15/691,005, filed on Aug. 30, 2017, now Pat. No. 10,902,496, which is a
(Continued)

(51) Int. Cl.
*G06Q 30/06* (2023.01)
*G06Q 30/02* (2023.01)
(Continued)

(52) U.S. Cl.
CPC ..... *G06Q 30/0625* (2013.01); *G06Q 30/0251* (2013.01); *G06Q 30/0623* (2013.01);
(Continued)

(58) Field of Classification Search
CPC ........... G06Q 30/0625; G06Q 30/0251; G06Q 30/0623; G06Q 30/0639; G06Q 30/0641; G06Q 30/0643
(Continued)

(56) References Cited

U.S. PATENT DOCUMENTS 7,945,484 B1    5/2011    Tam et al.
9,799,062 B2    10/2017    Narasimhan et al.
(Continued)

OTHER PUBLICATIONS

Information Note on Protected Designation of Origin (PDO), Protected Geographical Indication (PGI) & Traditional Speciality Guarenteed (TSG), Food Safety, Authority of Ireland; Mar. 2003 (Mar. 2003). [Accessed via https://www.fsai.ie/uploadedfiles/about_us/forums/artisan/pdo_pgi_tsg_info_note.pdf] (Year: 2003).*
(Continued)

*Primary Examiner* — Allison G Wood
(74) *Attorney, Agent, or Firm* — Schwegman Lundberg & Woessner, P.A.

(57) ABSTRACT

Generally discussed herein are systems, apparatuses, and methods for providing information regarding a product that is unique to a geographical region. In one or more embodiments a method may include determining a location of a user, receiving information indicative of one or more products unique to a particular geographical region corresponding to the determined location of the user, wherein each of the one or more products are offered for sale in the particular region by one or more merchants, and providing information about at least one of the products and about a merchant, from the one or more merchants, offering that product for sale in the geographical region.

20 Claims, 9 Drawing Sheets

Related U.S. Application Data continuation of application No. 14/542,740, filed on Nov. 17, 2014, now Pat. No. 9,799,062.

(51) Int. Cl.
 *G06Q 30/0601* (2023.01)
 *G06Q 30/0251* (2023.01)

(52) U.S. Cl.
 CPC ..... *G06Q 30/0639* (2013.01); *G06Q 30/0641* (2013.01); *G06Q 30/0643* (2013.01)

(58) Field of Classification Search
 USPC ....................................................... 705/26.62
 See application file for complete search history.

(56) References Cited

U.S. PATENT DOCUMENTS

| | | | |
|---|---|---|---|
| 10,902,496 B2 | 1/2021 | Narasimhan et al. | |
| 2001/0051876 A1 | 12/2001 | Seigel et al. | |
| 2002/0026380 A1 | 2/2002 | Su | |
| 2005/0289131 A1 | 12/2005 | Aenlle et al. | |
| 2009/0012865 A1* | 1/2009 | Celik | G06F 16/29 705/28 |
| 2012/0123904 A1 | 5/2012 | Foerster | |
| 2013/0066740 A1 | 3/2013 | Ouimet et al. | |
| 2014/0136365 A1 | 5/2014 | Nista | |
| 2015/0031388 A1* | 1/2015 | Chatterjee | G06Q 20/322 455/456.1 |
| 2015/0073942 A1 | 3/2015 | Narasimhan et al. | |
| 2017/0364987 A1 | 12/2017 | Narasimhan et al. | |

OTHER PUBLICATIONS

U.S. Appl. No. 14/542,740 U.S. Pat. No. 9,799,062, Nov. 17, 2014, Providing Information Related to a Product Unique to a Geographical Region.

U.S. Appl. No. 15/691,005 U.S. Pat. No. 10,902,496, Aug. 30, 2017, Method, Machine-Readable Medium, and System for Proximity-Based Services for Products Marked by Geographic Indications (as amended).

Food Safety,"Information Note on Protected Designation of Origin (PDO), Protected Geographical Indication (PGI) & Traditional Speciality Guaranteed (TSG)", Accessed via https:/ /www.fsai.ie/ uploadedfiles/about_us/forums/artisan/pdo pgi_tsg_info note.pdf, Authority of Ireland, Mar. 2003, 44 pages.

First Action Interview—Office Action Summary Received for U.S. Appl. No. 14/542,740, dated Mar. 29, 2017, 8 pages.

First Action Interview—Pre-Interview Communication Received for U.S. Appl. No. 14/542,740, dated Jan. 27, 2017, 6 pages.

Notice of Allowance Received for U.S. Appl. No. 14/542,740, dated Jun. 20, 2017, 16 pages.

Advisory Action Received for U.S. Appl. No. 15/691,005, dated Jul. 24, 2020, 3 pages.

Final Office Action Received for U.S. Appl. No. 15/691,005, dated Apr. 9, 2020, 35 pages.

Non-Final Office Action Received for U.S. Appl. No. 15/691,005, dated Oct. 3, 2019, 27 pages.

Notice of Allowance Received for U.S. Appl. No. 15/691,005, dated Sep. 16, 2020, 17 pages.

\* cited by examiner

METHOD, MACHINE-READABLE MEDIUM, AND SYSTEM FOR PROXIMITY-BASED SERVICES FOR PRODUCTS BASED ON MERCHANT DENSITY

CLAIM OF PRIORITY

This application is a continuation of U.S. application Ser. No. 15/691,005, filed Aug. 30, 2017, which is a continuation of U.S. application Ser. No. 14/542,740, filed Nov. 17, 2014, each of which is incorporated herein by reference in its entirety.

TECHNICAL FIELD

The present disclosure relates generally to providing information related to a product or service unique to a geographical region.

BACKGROUND

Tourism is a multibillion dollar industry. People travel to see friends, family, partake in unique recreational activities, and visit historical landmarks or buildings, among other reasons. People also travel to have a unique cultural experience, to experience things that are unique to a particular region that they are travelling to.

BRIEF DESCRIPTION OF THE DRAWINGS

Some embodiments are illustrated by way of example and not limitation in the accompanying figures.

DETAILED DESCRIPTION

Figure 1:
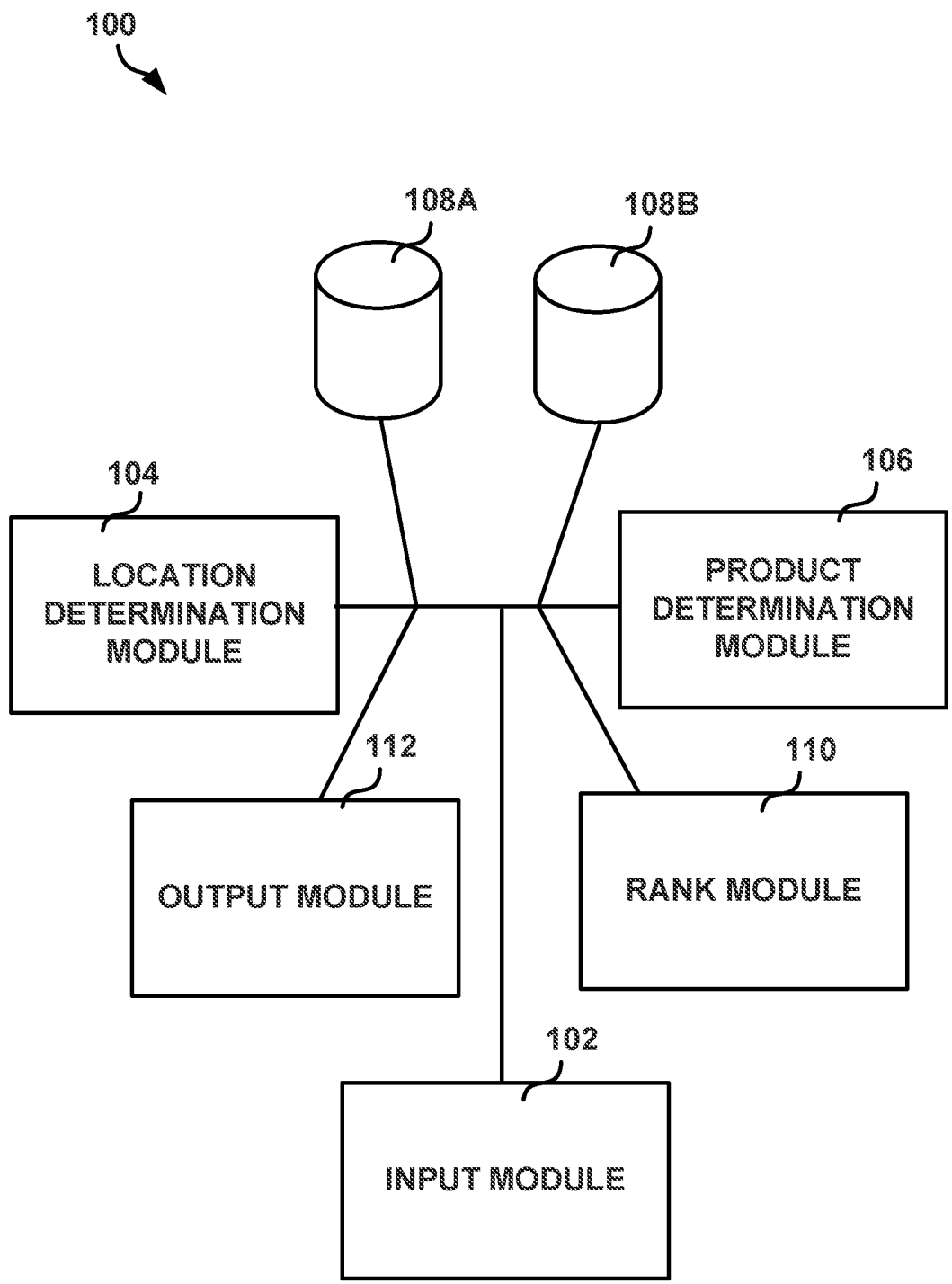
FIG. 1 is a block diagram illustrating a system for providing information related to a product unique to a geographical region, in accord with one or more embodiments.

Described herein are systems, apparatuses, and methods for providing information related to a product unique to a geographical region. Various modifications to the embodiments will be readily apparent to those skilled in the art, and the generic principles defined herein may be applied to other embodiments and applications without departing from the scope of the disclosure. Moreover, in the following disclosure, numerous details are set forth for the purpose of explanation. However, one of ordinary skill in the art will realize that one or more of the embodiments may be practiced without the use of some of these specific details. In other instances, well-known structures and processes are not shown in block diagram form in order not to obscure the description of the example embodiments with unnecessary detail. Thus, the present disclosure is not intended to be limited to the embodiments shown, but is to be accorded the widest scope consistent with the principles and features disclosed herein.

Connecting local commerce, such as products that are unique to a particular geographical region and merchants that sell those products, with a community larger than the community local to the particular geographical region (e.g., a county, city, town, mountain, river, lake, valley, a state, territory, country, or national, international, or global community) is generally a difficult and largely unaddressed problem. For example, in India, many regions, states, and localities have some product that is unique to that area. Thanjavur, a town in south India, for instance, is popular (at least locally) for dancing dolls, art plates, Veena (a musical instrument), and paintings. As another example, Kumbakonam, a town near Thanjavur is popular (at least locally) for betel leaves and filter coffee, among other items. However, most of these things are unknown to many people outside these respective geographical regions. People who travel to these places may be unaware of these unique products that, in many instances, cannot be found and/or are not produced elsewhere.

There are many items that are either truly unique (e.g., exclusive) to a particular region (e.g., Champagne from the region of Champagne in France) or are unique in that they are noteworthy for being of a higher quality than a similar product from another region. These items may be designated as geographically unique by a formal Geographic Identification (GI) tag (e.g., a GI tag as designated in the Paris Convention, the Agreement on Trade Related Aspects of Intellectual Property Rights (TRIPS), the Lisbon Agreement on the Protection of Appellations of Origin and their Registration, appellation d'origine controlee (AOC) in France, a Protected Designation of Origin (PDO), the Protected Geographical Indication (PGI), Traditional Specialties Guaranteed as in European Union (EU) law, the concept of terroir, or in a trademark or tradename), or identified as geographically unique by mining data to determine the origin of a good or service that may be considered somehow unique or popular in a specific geographical region.

The protection afforded by a GI may be similar to the protection afforded by a trademark or a certification mark. A GI mark is generally restricted to use on a product that originates, is made from materials, or is made using methods of manufacture that originate from a specific region. Some GI marks require certain quality standards to be met or the product to pass certain quality tests in order for the GI mark to be used on a product. A GI mark generally helps a consumer by acting as a sort of guarantee that the product with the GI mark is consistent with other products that also bear the mark.

Products with GI marks are generally produced by communities that have gained a reputation for one or more products with a specific quality. The protection afforded by a GI mark may help allow a producer to invest in retaining the specific qualities which form the basis for the reputation. A GI mark may also help a producer in marketing the product. A GI mark may help preserve a tradition or know-how.

One or more embodiments discussed herein may help in promoting or providing access to a product unique to a particular geographical region (e.g., a product that is protected by a GI, trademark, or tradename, or a product that is known to be from a particular geographical region and includes one or more properties unique to that geographical region).

Reference will now be made to the FIGS. to describe more details of embodiments.

FIG. 1 is a block diagram illustrating a system 100 for providing information related to a product unique to a geographical region, in accord with one or more embodiments. The system 100 may include an input module 102, a location determination module 104, a product determination module 106, one or more databases 108A or 108B, a rank module 110, and/or an output module 112.

In one or more embodiments, the system may include an input module 102. The input module 102 may include a display (e.g., a touch screen or monitor), a mouse or other navigation or input device, a microphone, or other input device. The input module 102 may include a User Interface (UI), such as the UI shown in FIG. 5. The input module 102 may prompt a user to input a product category, a location, or whether the user is interested in viewing products that are unique to a location. The input may be received through a text box, radio button, push button, check box, a group box, a scroll or drop down list, or a user's voice, among others. The input module 102 may provide the input data to the location determination module 104, product determination module 106, database(s) 108A-B, rank module 110, or the output module 112, for example.

The location determination module 104 may determine a general location of a user, such as by determining a general location of an object associated with a user. The location determination module 104 may use user input data provided via the input module 102 (e.g., a user-indicated zip code, address, city, state, county, region, territory, country, other location information, or a combination thereof), a Global Positioning System (GPS), Internet Provider (IP) Access Point (AP) location, cell tower location, WiFi Hot Spot or Access Point (AP) location, Bluetooth signal, other technique, or a combination thereof to help determine a general location of a user. The location determination module 104 may provide the determined location as an output. The location may include geographical regions of varying sizes. In some embodiments, the location may include an address, a region (e.g., neighborhood) of a city, a city, a region corresponding to a zip or postal code, a county, multiple cities, one or more states, one or more countries, a continent, etc. The location may be specified by latitude and longitude coordinates or similar location data, in one or more embodiments.

The product determination module 106 may provide a list of products that includes one or more unique products. A unique product is a product that is either truly unique (e.g., exclusive) to a particular region or is unique in that it is noteworthy for being of a higher quality than a similar product from another region. As used herein, a product covered by a GI mark is considered a unique product. The list of products may be determined using the location of the user, a search term, or a combination thereof. The list of products may be determined by querying one or more databases 108A-B that list products, including one or more unique products. For example, the product determination module 106 may query the databases 108A-B to retrieve products unique to Napa Valley. In another example, the product determination module 106 may query the databases 108A-B to retrieve products (if any) unique to a particular zip code, county, state, city, region of a city, or other geographical region. The geographical region may be specified by latitude and longitude coordinates in one or more embodiments. The latitude and longitude coordinates may provide a location within a geographical region to focus around. The product determination module 106 may provide a list of one or more products that match the location and/or the search term as an output.

The database(s) 108A-B includes detailed information about a variety of products. For example, the databases(s) 108A-B may include product information such as a product name, description, category, image, cost, region/location of origin, whether the product is unique and, if the product is unique, under what GI regime the product is registered (if any), why the product is considered unique (e.g., why the product is popular or what distinguishes the product from other, similar products), or the like. The database(s) 108A-B may further include merchant information associated with a product, such as a merchant name (e.g., a business name), address, online and/or offline merchant rating, description, or other merchant information. A product in the database(s) 108A-B may be associated with region of origin which can be represented by latitude and longitude coordinates, a zip code, county, state, country, or other region information that conveys a geographical region. The database(s) 108A-B may also include information corresponding to a map of a geographical region associated with the location of the user. The information in the database(s) 108A-B may be organized in a manner that makes it searchable using, for instance, a Structured Query Language (SQL) or other search query. The products in the database(s) 108A-B may be indexed by region of origin, product category, merchant location, and/or a combination thereof, among others.

The information in the database(s) 108A-B regarding whether the product is a GI product, may include information regarding GI products registered under the Paris Convention, the Agreement on Trade Related Aspects of Intellectual Property Rights (TRIPS), the Lisbon Agreement on the Protection of Appellations of Origin and their Registration, appellation d'origine controlee (AOC) in France, a Protected Designation of Origin (PDO), the Protected Geographical Indication (PGI), or Traditional Specialties Guaranteed as in European Union (EU) law, the concept of terroir, or in a trademark or tradename, among others. The database(s) may include a third-party database of GI products, or the system 100 may have access to such a third-party database, for example, through a network (e.g., the Internet).

The rank module 110 may determine an order in which to present the identified products to a user. The rank module 110 may query the database 108A-B to determine a rating of a merchant associated with a product. The rank module 110 may use the merchant rating, a product rating, a cost of the product, and/or other information in determining the rank of a product. The rating of the merchant may be a rating from customers who purchased product from the merchant's online or offline store. A merchant's online store includes one or more web services accessible over the Internet, through which a user may purchase a product. A merchant's offline store is a place with a physical location that a user may visit. In one or more embodiments, the rank module 110 may rank products based on the ratings of the merchants associated therewith, such that are products with higher merchant ratings are displayed higher on the list than products with relatively lower merchant ratings. Alternatively or additionally, in one or more embodiments, the rank module 110 may rank a unique product higher than a non-unique product. The rank module 110 may filter products based on whether they are unique and then further rank the unique products based on a merchant rating associated with the unique product.

The rank module 110 assigns a rank designation to a product (e.g., a number, letter, or other designation). The rank designation may be representative of a sum, a weighted sum, or other combination of attributes of a product. For example, a product that is considered unique may include a base rating designation of ten, while a product that is considered non-unique may include a base rating designation of zero in an instance where a user indicates they are interested in a unique product. In another example, a product that is associated with a merchant that is rated positively can include a rating designation of ten, while a product that is considered non-unique may include a rating designation of zero. Similar rating designations can be assigned for other product attributes. The rating designations, or a subset of the rating designations, for the product can be summed or otherwise combined to determine a final rating designation for the product. A product with a final rating designation greater than another product can be ranked higher by the rank module 110.

The output module 1112 may include a speaker, display, projector, or other device capable of conveying information to a user. The output module 112 may include a Graphical User Interface (GUI) that may display an image (such as an image similar to the map shown in FIGS. 2, 3, 4, or the GUI shown in FIG. 5. The output module 112 may convey information to a user in a variety of formats, such as those shown in FIGS. 2-5 or a combination thereof. The output module 112 may provide information regarding one or more products unique and/or available in a geographical region. The output module 112 may query the database(s) for information to be presented to the user. The output module 112 may receive information form the input module 102, the location determination module 104, product determination module 106, database(s) 108A-B, and/or the rank module 110, and render an image using the received information. Examples of such functionality are discussed with regard to FIGS. 2-5 below.

A variety of use cases of the system 100 will now be presented to aid in understanding some of the functionality and/or interaction of the modules and components of the system 100.

In one or more embodiments, a user may be travelling in a foreign location. The user may not be aware of products that are unique to the foreign location. The location determination module 104 may determine the location of the user and provide the determined location to the product determination module 106, database(s) 108A-B, the rank module 110, and/or the output module 112. In an alternative embodiment, the user may provide the foreign location using the input module 102. The product determination module 106 may query the database(s) 108A-B using the determined or received location to retrieve a list of products that includes one or more products unique to the foreign location. The list of products may include information regarding the products, such as a merchant name, address, rating, and/or description of the product. The rank module 110 may rank the products based on the merchant's online or offline rating, a product rating, a cost of the product, and/or other information. The output module 112 may present the user with a list of products including one or more products unique to the foreign location (e.g., a geographical region including the foreign location). Thus, the system 100 may provide a user with insight as to what products are unique to the region and/or possibly worth looking at in more detail.

In one or more embodiments, a user may specify that they are only interested in products unique to the geographical region, indicate a boundary of the geographical region he is interested in, a category of the products he is interested in (e.g., clothing, food, drink, weapon, toy, recreational or educational activity, among other categories), one or more merchants he is interested in visiting, among other details. The product determination module 106 may query the database(s) 108A-B such that results returned to the product determination module 106 are consistent with the user specification(s), or may first obtain a "raw" list of products from the database 108A-B and thereafter filter the results received from the database 108A-B based on the user specification(s). The query may be transmitted to the database(s) 108A-B in a format compatible with the database(s) 108A-B, interpreted by the database(s) 108A-B or circuitry associated with the database(s) 108A-B, and the database(s) 108A-B may return the product(s) that match one or more of the specifications of the user. For example, if a user specifies a geographical region he is interested in or a geographical region associated with a user's location is specified, the specified geographical region is compared to a region of origin associated with the product to determine if the product is associated with the specified geographical region. In this manner, products unique to a geographical region may be organized and retrieved by geographical location. Similarly, if a user specifies a category of products, the specified category is compared to the category field of the products in the database(s) 108A-B to determine if the product is a member of the specified category. Similar comparisons may be made for other fields that can be specified by a user and associated with a product in the database(s) 108A-B.

In one or more embodiments, if a user specifies that they are interested in a category of products and they are interested in unique products a query is produced (e.g., by the product determination module 106) that retrieves products that include an associated category or description that sufficiently matches the category specified the user and also includes an indication that the product is a unique product.

In one or more embodiments, a rating of a merchant's online store may be presented to a user who may be interested in visiting the merchant's offline store, such as by using one or more of the modules or database(s) of the system 100. The rating of the merchant's online store may influence whether the user is interested in visiting the merchant's offline store. Thus, the online rating of the merchant may provide value to the user shopping in the offline store. Similarly, in one or more embodiments, a rating of a merchant's offline store may be presented to a user who may be interested in visiting the merchant's online store, such as by using one or more of the modules or database(s) of the system 100. Thus, the rating of the merchant's offline store may provide value to the user shopping on the online store. In one or more embodiments, a rating for a merchant or a product may include one or more ratings from an online transaction and one or more ratings from an offline transaction. Thus, the online and offline presence of the merchant may each affect a user's perception of the merchant's business.

In one or more embodiments, a user may be interested in ordering a product offered from a merchant's offline store online, such as in instances where the user does not want to travel with the item. The user could have the product shipped to her home or other location through ordering the product from the merchant's online store. In this way, the user may view or touch the product, discuss the product with people in the geographical region, and/or discuss the product with the merchant before she buys the product. Thus, using the system 100, the merchant's offline business may provide value to the merchant's online business. A product may include a Quick Reference (QR) code or other indication of where to find the product online so as to help the user access the product online. In some instances, the user may order the product online while still in the offline store, e.g., by using an e-commerce application running on her mobile device.

In one or more embodiments, the input module 102 may receive a user's rating and/or other descriptive information that may be included in a review of a merchant or product. This information may be stored in the database 108A-B. The review may be of a merchant's online or offline business or product. The review may be used in determining a merchant's online or offline business rating or may be used to determine a rating for a product.

More use cases and details regarding the system 100 may be presented below in the discussion of FIGS. 2-9.

Figure 2:
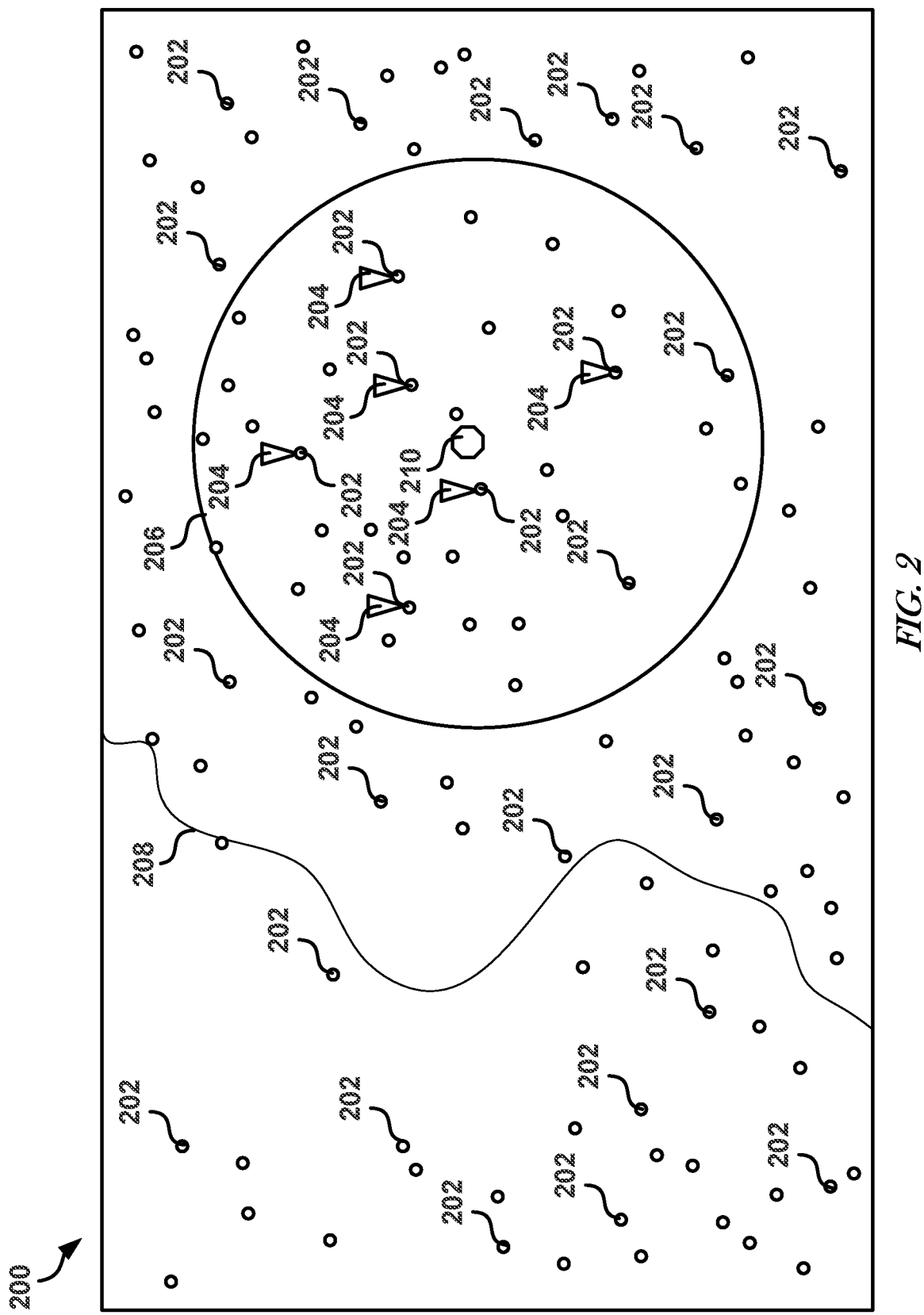
FIG. 2 is a diagram illustrating a map that indicates one or more locations where one or more products unique to a geographical region may be sold, in accord with one or more embodiments.

FIG. 2 is a diagram illustrating a map 200 that indicates one or more locations where one or more products unique to a geographical region are sold, in accord with one or more embodiments. The map 200 may be presented to a user, such as using the output module 112. The map 200 may be of a geographical region including a plurality of locations 202 (e.g., a city, business, marketplace, etc.) indicated by the circles in FIG. 2. Not all of the locations 202 are labeled so as to not obscure the view of FIG. 2. One or more of the locations 202 may be associated with a unique product. These locations 202 may be labeled with a marker 204 that indicates that the unique product is available at the location 202 or that the location 202 is associated with the unique product.

The map 200 may be an interactive map. The output module 112 may cause information about a location 202 or marker 204 to be displayed on and/or near the map 200 in response to a user pointing to or selecting the location 202 or marker 204. In one or more embodiments, the pointing or selecting by the user may be accomplished using, e.g., a touch screen (e.g., a user touching, or performing a gesture, on the touch screen), a voice command, or a mouse point and/or click, among other techniques of pointing or selecting. Markers 204 may be displayed on the map 200 at locations 202 within a predetermined or specified distance from the user's location 210. In the example shown in FIG. 2, the distance from the user corresponds to a radius of a circle 206 centered at the user's present location 210. Only markers 204 falling within that circle are shown on the map 200, in one or more embodiments. In other embodiments, the markers 204 are not necessarily limited to locations within a predetermined or specified distance from the user's current location, but may be displayed anywhere on the map, or within boundaries otherwise determined. For example, a map of a country, state, continent, or other region may be produced with one or more markers 204 displayed thereon irrespective of the distance from the user. Consider a scenario where a user is in the United States, but is planning a trip to India, but does not know where in India they should visit. The user may query for unique products or experiences in India (e.g., that meet or do not meet certain criteria) and a map of India with one or more Markers 204 may be displayed to the user. Such a map may aid a user in determining which part of India to visit.

The information about the location 202 or the marker 204 may include a distance from the user's current location, a name of the product, an indication of whether the product is unique (e.g., includes a GI tag), a quality of the product that makes the product eligible for the GI tag, an online or offline rating of a merchant associated with the GI tag, a control that, when selected, provides a user with directions to the location 202 associated with the marker 204, a cost of the unique product(s) associated with the marker 204, among other information.

One or more geographical features 208 may be displayed on the map 200. The geographical feature 208 may include a boundary between geographical regions, such as shown in FIG. 2, or another geographical feature, such as a mountain, body of water, topography, city, county, state, country, or continental border, among other geographical features. The map 200 may include roads shown and/or labeled thereon.

Figure 3:
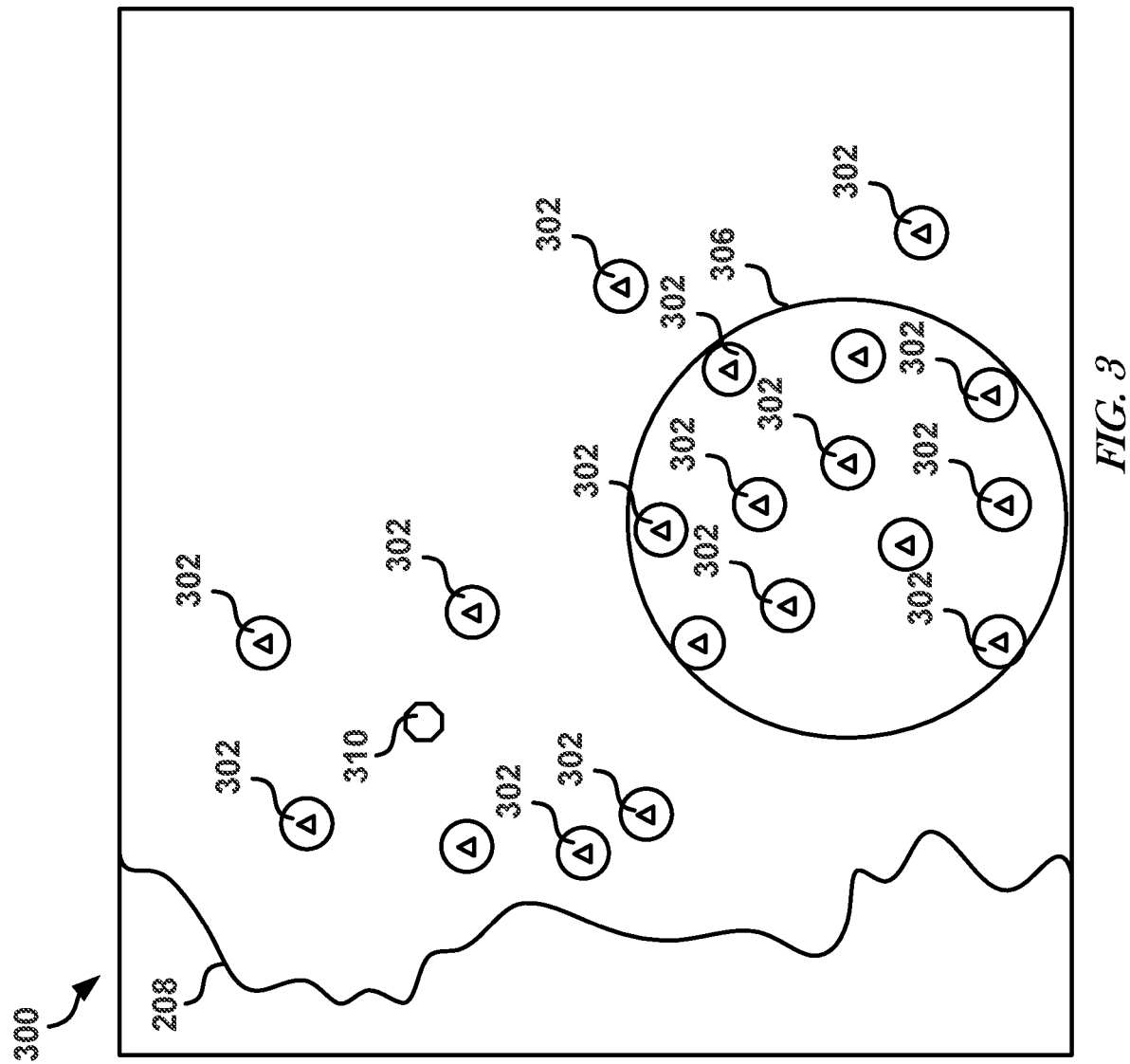
FIG. 3 is a diagram illustrating another map that indicates one or more locations where one or more products unique to a geographical region may be sold, in accord with one or more embodiments.

FIG. 3 is a diagram illustrating another map 300 that indicates one or more locations where one or more products unique to a geographical region are sold, in accord with one or more embodiments. The map 300 may be similar to the map 200, with the map 300 recommending locations 302 to a user based on location density as well as the user's location 310. Not all of the locations 302 are labeled so as to not obscure the view of FIG. 3. The location 302 may be similar to a combination of the location 202 and the marker 204, in that the location 302 may be a location designation and an indication that the location 302 includes a product unique to the geographical region.

In the example of FIG. 3, the user may be recommended one or more products or locations 302 that include a concentration of unique products that is above a specified threshold. In the example of FIG. 3, the products recommended to the user may be within the circle 306. The circle 306 may correspond to the locations 302 that are the densest in the displayed region. Such a determination of products to recommend based on the density is called "geo-fencing" herein. Note that although the user is at the user location 310 and there are locations 302 that may include a unique product closer to the user's location than the locations within the circle 306, the user may be recommended a unique product associated with a location 302 within the circle 306. Such an embodiment may alert a user as to a geographical region (e.g., the region within the circle 306) that the user may visit to see a variety of unique products with a relatively small amount of travel.

Figure 4:
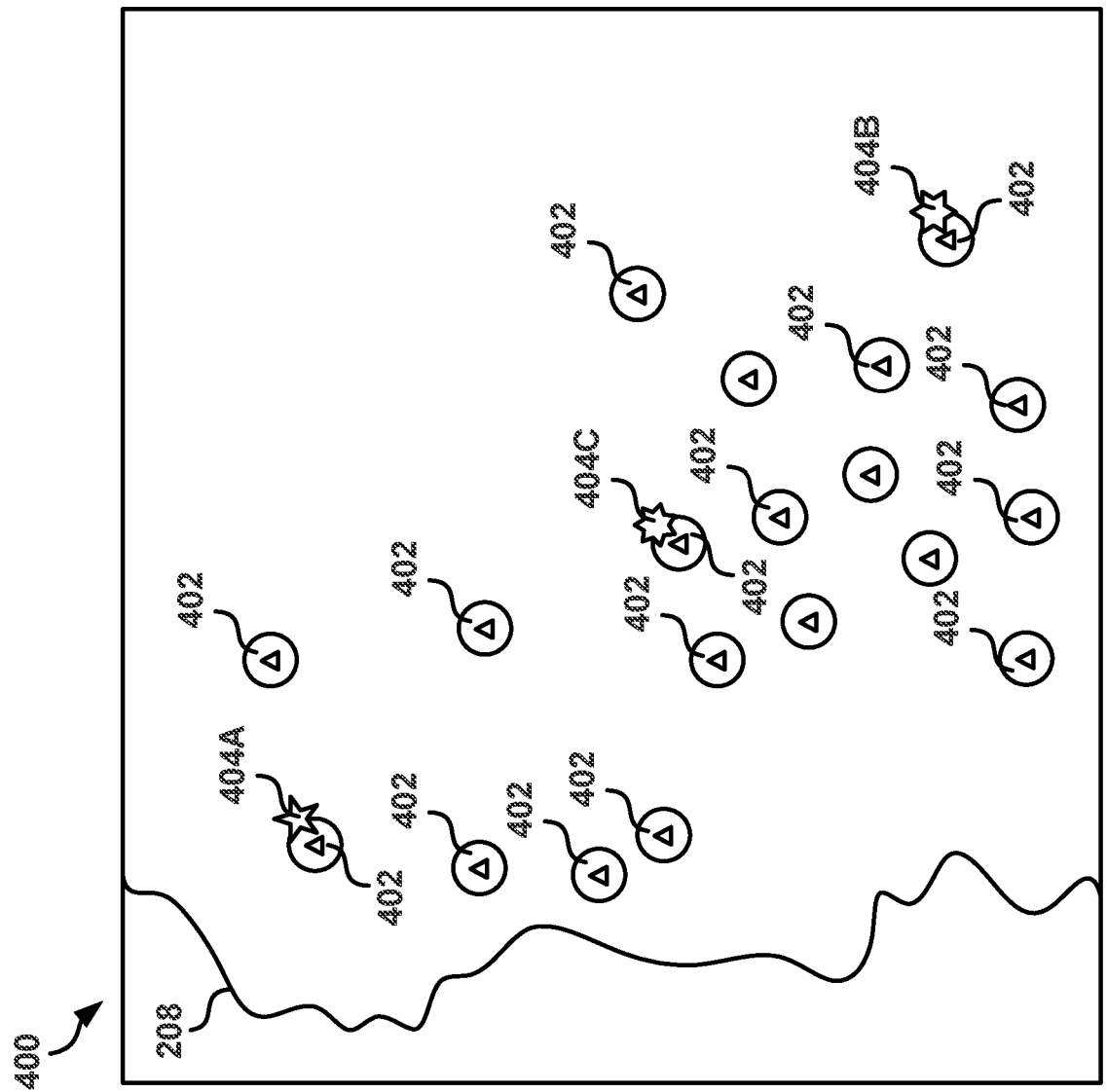
FIG. 4 is a diagram illustrating yet another map that indicates one or more locations where one or more products unique to a geographical region may be sold, in accord with one or more embodiments.

FIG. 4 is a diagram illustrating yet another map 400 that indicates one or more locations 402 where products unique to a geographical region may be sold, in accord with one or more embodiments. The map 400 may be similar to the map 300 of FIG. 3, with the map 400 including one or more rating designations 404 indicating an online or offline rating of a merchant associated with a corresponding location 402. Not all of the locations 402 are labeled so as to not obscure the view of FIG. 4. The location 402 may be similar to a combination of the location 202 and the marker 204. Different rating designation symbols may correspond to different levels of merchant ratings. For example, the rating designation 404A may indicate a lower merchant rating than the rating designation 404B, which may indicate a lower rating than the rating designation 404C. In the example of FIG. 4, the number of points on the star symbol that represents the rating designation 404A-C can indicate a rating level. In one or more embodiments, a color, number, letter, other indicator, or a combination thereof, can be used to designate a rating level.

The rating designation 404 may be indicative of a rating of a merchant's online store or of a merchant's offline store. In one or more embodiments, the rating designation 404 may be stored in the database 108A-B and retrieved by one of the modules of the system 100. In one or more embodiments, the rating designation may be determined by one of the modules of the system 100.

The rating designation 404 of a merchant may be indicative of a composite score that may be determined based on ratings or feedback regarding a buyer or re-seller interaction with the merchant. The composite score may be determined based on combining individual ratings from multiple buyers or sellers of the merchant's products. For example, a user with a positive experience with the merchant may record a positive rating or positive feedback and such feedback may increase the composite score. In another example, a user with a negative experience with the merchant may leave a negative rating or negative feedback and such a rating or feedback may decrease the composite score. A merchant with a higher composite score may have a rating designation 404 that is distinct from the rating designation of a merchant with lower composite score. The rating designation 404 is indicative of the rating of the merchant (i.e. the merchant rating) as was previously discussed with regard to filtering and ranking products, such as may be accomplished using the rank module 110.

Displaying the rating designation 404 may help a user in determining which merchant to visit. A user may decide to visit a merchant with a rating designation 404, since the rating designation increases the likelihood of a positive shopping experience. In an instance where the rating designation 404 is of a merchant's online store and the rating designation 404 influences a user to either visit or not visit a merchant's offline store, the merchant's online store performance may provide value (i.e., positive or negative value) to the merchant's offline store. Similarly, a rating designation 404 of a merchant's offline store may influence a user to either visit or not visit the merchant's online store, thus providing positive or negative value to the merchant's online store. In this manner, the rating designation 404 may help improve a quality of service from merchants both offline and online.

Figure 5:
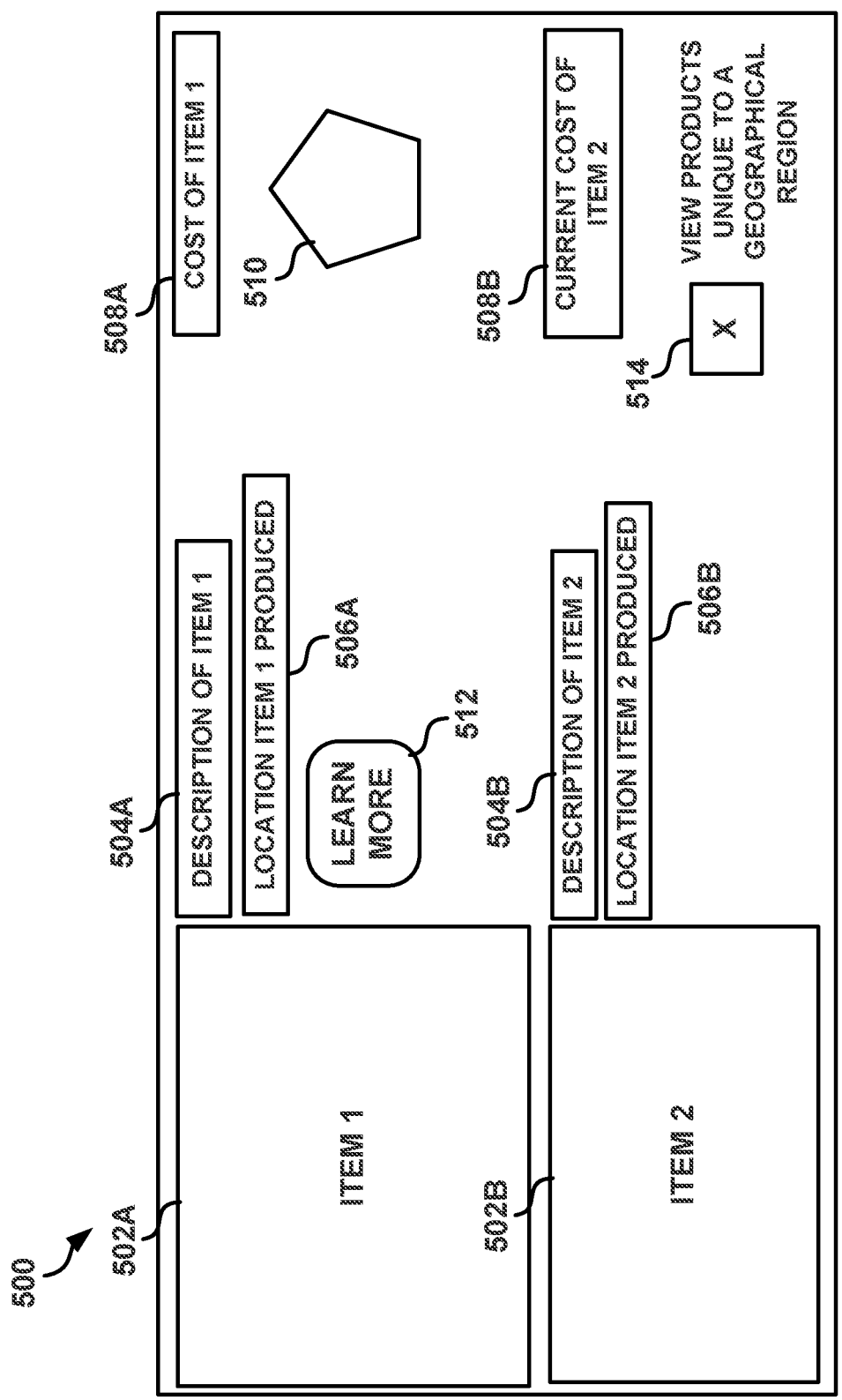
FIG. 5 is a block diagram illustrating a user interface configured to provide a user with information related to product unique to a geographical region, in accord with one or more embodiments.

FIG. 5 is a block diagram illustrating a user interface 500 that may be used to provide a user with information related to a product unique to a geographical region, in accord with one or more embodiments. The UI 500 may include one or more items 502A and/or 502B. The items 502A-B may include a picture, video, or other visual indicator of the item (e.g., a product for sale, such as a unique product for sale). The UI 500 may include a description 504A and/or 504B for each respective item 502A and/or 502B. The description 504A-B may include a textual description of the item 502A-B. The UI 500 may include a textual or pictorial description of a location 506A and/or 506B of where a respective item 502A and 502B may be purchased or originate from. The UI 500 may include a cost of purchasing 508A and/or 508B a respective item 502A and 502B. The cost of purchasing 508A-B may include a cost of purchasing the item 502A-B immediately or may include a current cost of the item 502A-B, such as in an instance where the item 502A-B is the subject of an auction.

The UI 500 may include a GI indication 510. The GI indication 510 indicates that the item 502A is a unique product. If an item does not include the GI indication 510, then the product may not be unique to a particular region, or the product may not be registered under a GI regime. The GI indication 510 may include an indication of why the item 502A is considered a unique product. The UI 500 may include a control 512 that, in response to being selected, causes a description of why the item is considered a unique product to be displayed. The UI 500 may also include the rating designation 404 of an online and/or offline merchant associated with the item 502A-B (not shown in FIG. 5).

The UI 500 may include a control 514 that, when selected by a user, causes items to be displayed that are unique to a geographical region. The user may specify the geographical region or a category of items that the user is interested in viewing. In one or more embodiments, when the control 514 is selected, only items that are unique to a geographical region are presented using the UI 500. In one or more embodiments, when the control 514 is selected, products unique to a geographical region may be presented to a user before items that are not unique to the particular geographical region. In one or more embodiments, when the control 514 is not selected, items unique to a particular geographical region do not receive preferential treatment over items that are not unique to a particular geographical region, such that no weight is applied to the GI product or that non-GI products are not otherwise filtered out or appear lower on the list as compared to GI products. Note that all GI products are unique, but not all unique products are registered under a GI regime.

Figure 6:
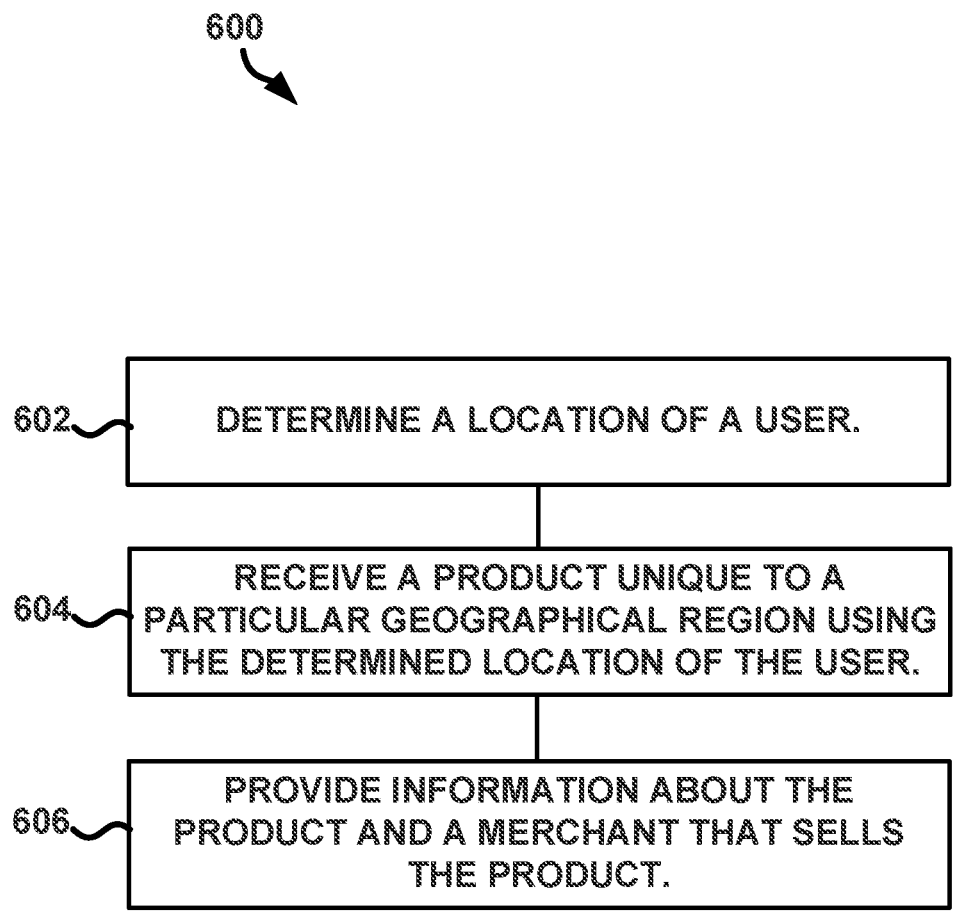
FIG. 6 is a flow chart illustrating a method for providing information related to a product unique to a geographical region, in accord with one or more embodiments.

FIG. 6 is a block diagram illustrating a method 600 for providing information related to a product unique to a geographical region, in accord with one or more embodiments. The method 600 as illustrated includes: determining a location of a user (e.g., based on user input, GPS data, the location of the user's mobile device as determined from a nearby cell tower location, etc.), at operation 602, such as by using the location determination module 104; receive (e.g., from a database 108A, 108B) data indicative of a product unique to a particular geographical region using the determined location of the user, at operation 604, such as by querying the database 108A-B using the product determination module 106; and provide information about the product and a merchant that sells the product, at operation 606, such as by using the output module 112. The merchant information and the product information may be associated with the product in the database 108A-B.

The operation at 606 may include providing contact information of the merchant, such as can be retrieved from the database 108A-B through a query. The merchant may be a merchant that sells the product both offline and online. The operation at 606 may include providing a rating of the merchant corresponding to services provided by the merchant in selling the product online, such as can be determined using the rank module 110 or other module by querying the database 108A-B.

The method 600 may include providing information indicative of a map of the particular region, augmented to include a symbol indicating a general location where the merchant sells a product of the one or more products offline. The information indicative of the map can be retrieved form the databases 108A-B. The method 600 may include augmenting the information indicative of the map to include a second symbol, the second symbol indicative of a rating of the merchant corresponding to services provided by the merchant in selling the product online. The output module 112 can be configured to alter the data indicative of the map to include a symbol. The product unique to the particular region may include a product covered by a geographical indication registration.

The method 600 may include providing a Uniform Resource Locator (URL) that points to an online domain where the merchant sells a product of the one or more products. The URL can be retrieved from the databases 108A-B. The information indicative of a map of the particular region includes displaying only merchants that are within a specified distance of a known origin of the product. The method 600 may include geo-fencing a plurality of locations of merchants, and the information indicative of the map of the particular region may include data indicative of the geo-fenced locations of merchants. The method at 600 may include providing a recommendation for another product that is unique to the geographical region. The method at 600 may include providing a recommendation for another product bought by another user that bought the product.

A few examples of use cases are presented herein. For example, a user traveling in a particular region may be shown those goods (and merchants) that offer one or more GI-certified products. In one or more embodiments, the merchants may be merchants on a web service, such as that provided by eBay. The merchants selected and the merchant's corresponding rating may depend on their rating provided by users of the web service who have interacted with the merchant (e.g., by purchasing one or more of their products). The traveler may visit the merchant's offline store, touch and feel the product, and either purchase the product in the offline store or using the online store, such as to simplify returning home with the product. In another embodiment, a user using the online web service may be shown those goods that are from a GI region, e.g., in response to the user's selection of an option to view products unique to a region.

Figure 7:
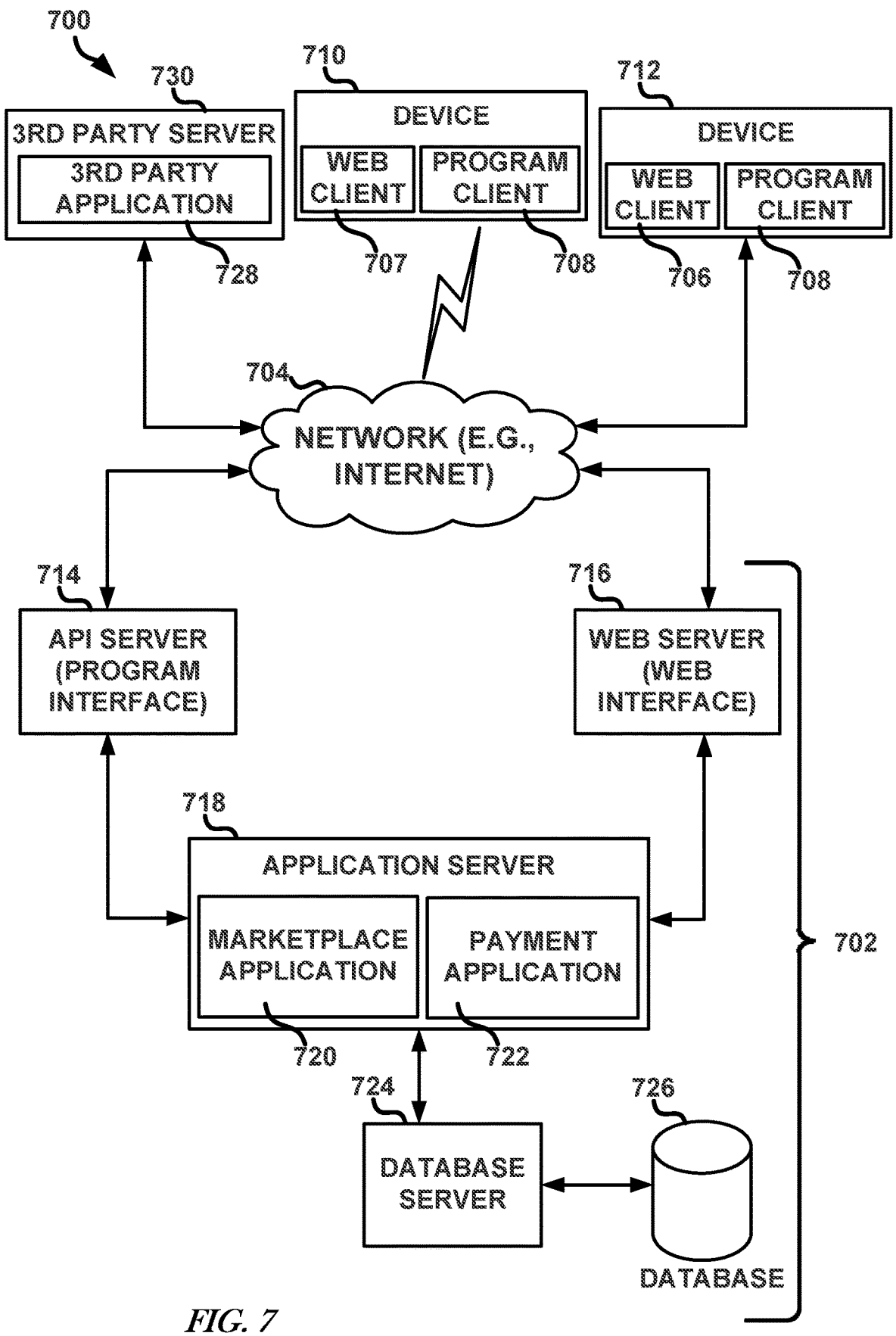
FIG. 7 is a block diagram illustrating a networked system, in accord with one or more embodiments.

FIG. 7 illustrates a network diagram depicting a network environment 700, in accord with one or more embodiments. The environment may include a client-server architecture configured for exchanging data over a network, such as can be used to implement one or more of the modules of the system 100. A networked system 702 may form a network-based publication system that provides server-side functionality, using a network 704 (e.g., the Internet or Wide Area Network (WAN)), to one or more clients and devices. FIG. 7 further illustrates, for example, one or both of a web client 706 (e.g., a web browser) and a programmatic client 708 executing on devices 710 and 712. In one or more embodiments, the network environment 700 includes a marketplace system. In one or more embodiments, the network environment 700 includes other types of systems, such as a social networking system, a matching system, a recommendation system, an electronic commerce (e-commerce) system, a search system, or the like.

Each of the devices 710, 712 may be or include a computing device that includes at least a display and communication capabilities with the network 704 to access the networked system 702, and often also one or more processors and associated memory. The devices 710, 712 may include remote devices, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, or the like. Each of the devices 710, 712 may communicate with the network 704 using a wired or wireless connection. For example, one or more portions of the network 704 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the devices 710, 712 may include one or more applications (also referred to as "apps") such as, but not limited to, a web browser, messaging application, electronic mail (e-mail) application, an e-commerce site application (also referred to as a "marketplace application"), and the like. In some embodiments, if the e-commerce site application is included in a given one of the devices 710, 712, then this application is configured to locally provide the user interface and at least some of the functionalities with the application configured to communicate with the networked system 702, on an as needed basis, for data and/or processing capabilities not locally available (e.g., access to a database of items available for sale, to authenticate a user, to verify a method of payment). Conversely if the e-commerce site application is not included in a given one of the devices 710, 712, the given one of the devices 710, 712 may use its web browser to access the e-commerce site (or a variant thereof) hosted on the networked system 702. Although two devices 710, 712 are shown in FIG. 7, more or fewer than two devices may be included in the network environment 700.

An Application Program Interface (API) server 714 and a web server 716 are coupled to, and provide programmatic and web interfaces respectively to, one or more application servers 718. The application servers 718 host one or more marketplace applications 720 and payment applications 722. The application servers 718 are, in turn, shown to be coupled to one or more databases servers 724 that facilitate access to one or more databases 726 (such as, e.g., databases 108A-B, or similar databases). The modules of the system 100, for example the location determination module 104, product determination module 106, output module 112, rank module 110, or the input module 102 may be implemented on the application servers 718 (e.g., as part of the marketplace application(s) 720), for example.

The marketplace applications 720 may provide a number of e-commerce functions and services to users that access the networked system 702. E-commerce functions/services may include a number of publisher functions and services (e.g., search, listing, content viewing, or payment). For example, the marketplace applications 720 may provide a number of services and functions to users for listing goods or services, listing offers for goods or services for sale, searching for goods and services, facilitating transactions, and reviewing and providing feedback about transactions and associated users. Additionally, the marketplace applications 720 may track and store data and metadata relating to listings, transactions, and user interactions. In some embodiments, the marketplace applications 720 may publish or otherwise provide access to content items stored in the application servers 718 or the databases 726 accessible to the application servers 718 or the database servers 724.

The payment applications 722 may likewise provide a number of payment services and functions to users. The payment applications 722 may allow users to accumulate value (e.g., in a commercial currency, such as the U.S. dollar, or a proprietary currency, such as "points") in accounts, and then later to redeem the accumulated value for products or items (e.g., goods or services) that are made available using the marketplace applications 720. While the marketplace application 720 and payment application 722 are shown in FIG. 7 to both form part of the networked system 702, it will be appreciated that, in alternative embodiments, the payment applications 722 may form part of a payment service that is separate and distinct from the networked system 702. In other embodiments, the payment applications 722 may be omitted from the networked system 702. In one or more embodiments, at least a portion of the marketplace applications 720 may be provided on the devices 710 or 712.

Further, while the network environment 700 shown in FIG. 7 employs a client-server architecture, embodiments of the present disclosure are not limited to such an architecture, and may equally well find application in, for example, a distributed or peer-to-peer architecture system. The various the marketplace application 720 and payment application 722 may also be implemented as standalone software programs, which do not necessarily have networking capabilities.

The web client 706 may access the marketplace application 720 and payment application 722 using the web interface supported by the web server 716. Similarly, the programmatic client 708 may access the various services and functions provided by the marketplace application 720 and payment application 722 using the programmatic interface provided by the API server 714. The programmatic client 708 may, for example, be a seller application (e.g., the TurboLister application developed by eBay Inc., of San Jose, Calif.) to enable sellers to author and manage listings on the networked system 702 in an off-line manner, and to perform batch-mode communications between the programmatic client 708 and the networked system 702.

FIG. 7 also illustrates a third party application 728, executing on a third party server 730, as having programmatic access to the networked system 702 using the programmatic interface provided by the API server 714. For example, the third party application 728 may, utilizing information retrieved from the networked system 702, support one or more features or functions on a website hosted by the third party. The third party website may, for example, provide one or more promotional, marketplace, or payment functions that are supported by the relevant applications of the networked system 702.

In addition to the networked system 702 facilitating e-commerce or electronic marketplace transactions, in some embodiments, the networked system 702 (or portions thereof) may comprise a back-end system for commerce environments, in general. For instance, the networked system 702 (or portions thereof) may handle payment, promotions, inventory management, or other support functions for storefront retailers. In any case, the databases 726 may include data corresponding to inventory available for commerce. Products, goods, services, or items comprising the inventory may be described and classified within the databases 726 to facilitate inventory management, sales, and/or a user query, such as may be received at the web server 716 or the API server 714. The query may be transmitted through the device 710, 712, and/or 3$^{rd}$ party application server 730. The query may indicate that the user is interested in a product unique to a geographical region and/or may indicate a specific geographical region. The database server 724 may translate a query into a format compatible with the database 726 and may execute the query on the information stored in the database 726.

The database 726 may include information aggregated from a plurality of databases that detail information regarding unique products. The database 726 can include information relating products by geographical region, category, merchant, unique characteristic(s) or other information. The products catalogued in the database 726 can include information as discussed with regard to the databases 108A-B.

Figure 8:
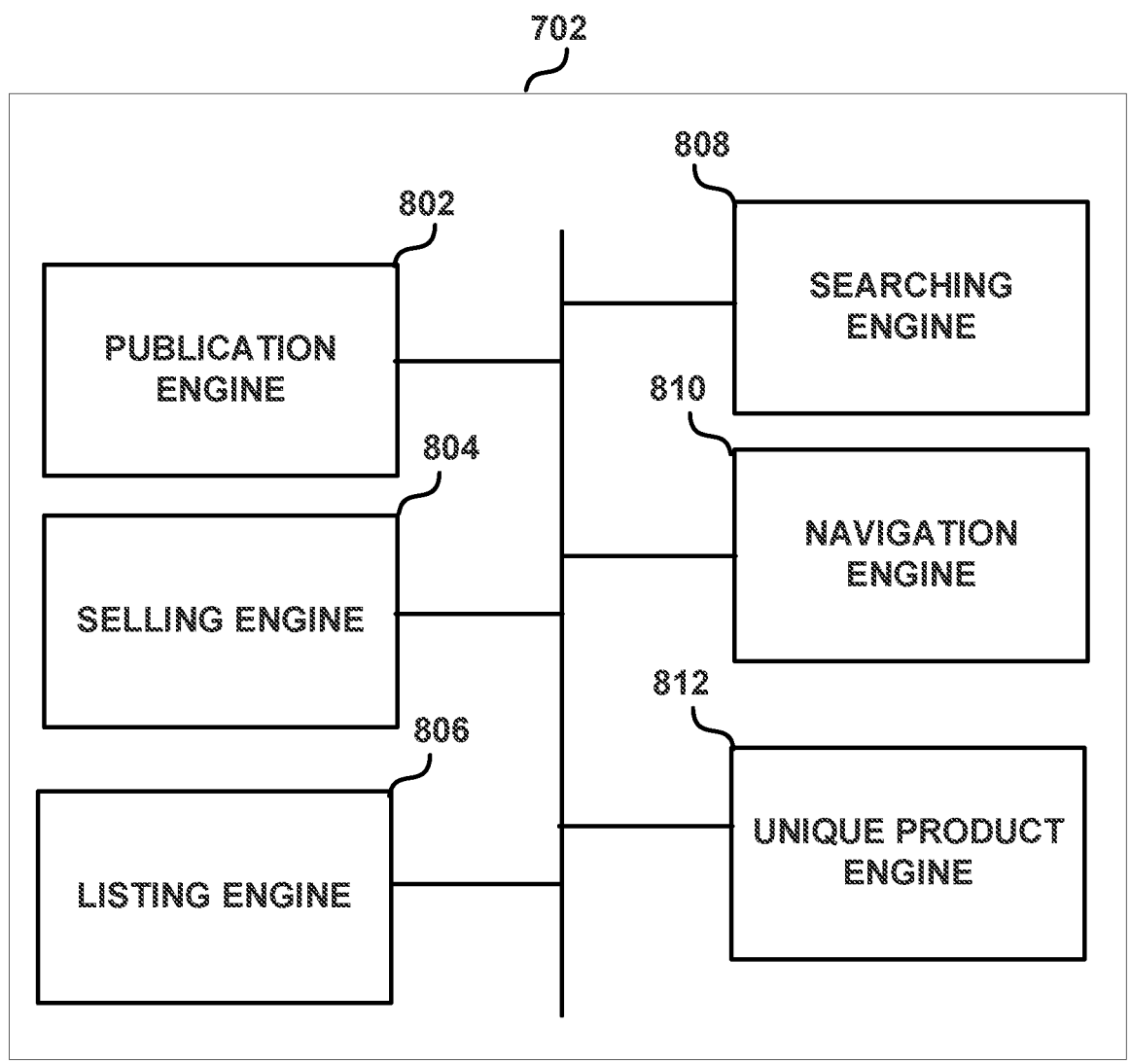
FIG. 8 is a block diagram of an example portion of the networked system of FIG. 7, in accord with one or more embodiments.

FIG. 8 is a block diagram of an example of a portion of a networked system 702, in accord with one or more embodiments. The system 100 may be implemented in the unique product engine 812 of the system 702. FIG. 8 illustrates a block diagram showing components provided within the networked system 702 according to some embodiments. The networked system 702 may be hosted on dedicated or shared server machines (not shown) that are communicatively coupled to enable communications between server machines. The components themselves may be communicatively coupled (e.g., using appropriate interfaces) to each other and to various data sources, so as to allow information to be passed between the applications or so as to allow the applications to share and access common data. Furthermore, the components may access one or more databases 726 using the database servers 724.

The networked system 702 may provide a number of publishing, listing, and/or price-setting mechanisms whereby a seller (also referred to as a "first user") may list (or publish information concerning) goods or services for sale or barter, a buyer (also referred to as a "second user") may express interest in or indicate a desire to purchase or barter such goods or services, and a transaction (such as a trade) may be completed pertaining to the goods or services. To this end, the networked system 702 may comprise at least one publication engine 802 and one or more selling engine 804. The publication engine 802 may publish information, such as item listings or product description pages, on the networked system 702. In one or more embodiments, the selling engine 804 may comprise one or more fixed-price engines that support fixed-price listing and price setting mechanisms and one or more auction engines that support auction-format listing and price setting mechanisms (e.g., English, Dutch, Chinese, Double, Reverse auctions). The various auction engines may also provide a number of features in support of these auction-format listings, such as a reserve price feature whereby a seller may specify a reserve price in connection with a listing and a proxy-bidding feature whereby a bidder may invoke automated proxy bidding. The selling engine 804 may further comprise one or more deal engines that support merchant-generated offers for products and services.

A listing engine 806 allows sellers to author listings of items or authors to author publications. In one or more embodiments, the listings pertain to goods or services that a user (e.g., a seller) wishes to transact using the networked system 702. In some embodiments, the listings may be an offer, deal, coupon, or discount for the good or service. Each good or service is associated with a particular category. The listing engine 806 may receive listing data such as title, description, and aspect name/value pairs. Furthermore, each listing for a good or service may be assigned an item identifier. In other embodiments, a user may create a listing that is an advertisement or other form of information publication. The listing information may then be stored to one or more storage devices coupled to the networked system 702 (e.g., databases 726 or 108A-B). Listings also may comprise product description pages that display a product and information (e.g., product title, specifications, and reviews) associated with the product. In some embodiments, the product description page may include an aggregation of item listings that correspond to the product described on the product description page.

The listing engine 806 also may allow buyers to conveniently author listings or requests for items desired to be purchased. In some embodiments, the listings may pertain to goods or services that a user (e.g., a buyer) wishes to transact using the networked system 702. Each good or service is associated with a particular category. The listing engine 806 may receive as much or as little listing data, such as title, description, and aspect name/value pairs, that the buyer is aware of about the requested item. In some embodiments, the listing engine 806 may parse the buyer's submitted item information and may complete incomplete portions of the listing. For example, if the buyer provides a brief description of a requested item, the listing engine 806 may parse the description, extract key terms and use those key terms to make a determination of the identity of the item. Using the determined item identity, the listing engine 806 may retrieve additional item details for inclusion in the buyer item request. In some embodiments, the listing engine 806 may assign an item identifier to each listing for a good or service.

In some embodiments, the listing engine 806 allows sellers to generate offers for discounts on products or services. The listing engine 806 may receive listing data, such as the product or service being offered, a price, a discount for the product or service, a time period for which the offer is valid, and so forth. In some embodiments, the listing engine 806 may permit sellers to generate offers from the sellers' mobile devices. The generated offers may be uploaded to the networked system 702 for storage and tracking.

Searching the networked system 702 is facilitated by a searching engine 808. For example, the searching engine 808 enables keyword queries of listings published using the networked system 702. In example embodiments, the searching engine 808 receives a keyword query from a device of a user and conducts a review of the storage device storing the listing information. The review may enable compilation of a result set of listings that may be sorted and returned to the client device (e.g., the device 710, 712) of the user. The searching engine 808 may record the query (e.g., keywords) and any subsequent user actions and behaviors (e.g., navigations, selections, or click-throughs).

The searching engine 808 also may perform a search based on a location of the user (e.g., detected using GPS). A user may access the searching engine 808 using a mobile device and generate a search query. Using the search query and the user's location, the searching engine 808 may return relevant search results for products, services, offers, auctions, and so forth to the user. The searching engine 808 may identify relevant search results both in a list form and graphically on a map. Selection of a graphical indicator on the map may provide additional details regarding the selected search result. In some embodiments, the user may specify, as part of the search query, a radius or distance from the user's current location to limit search results. The searching engine 808 also may perform a search based on an image. The image may be taken from a camera or imaging component of a client device 710 or 712 or may be accessed from storage.

In a further example, a navigation engine 810 allows users to navigate through various categories, catalogs, or inventory data structures according to which listings may be classified within the networked system 702. For example, the navigation engine 810 allows a user to successively navigate down a category tree comprising a hierarchy of categories (e.g., the category tree structure) until a particular set of listing is reached. Various other navigation applications within the navigation engine 810 may be provided to supplement the searching and browsing applications. The navigation engine 810 may record the various user actions (e.g., clicks) performed by the user in order to navigate down the category tree.

Additional modules and engines associated with the networked system 702 are described herein in further detail. Note that as used herein, an engine includes a plurality of modules electrically, communicatively, or mechanically coupled to operate in conjunction with one another. It should be appreciated that modules or engines may embody various aspects of the details described below. For instance, a unique product engine may be included in the networked system 702 to perform functions and operations of the system 100 or other operations discussed herein.

Figure 9:
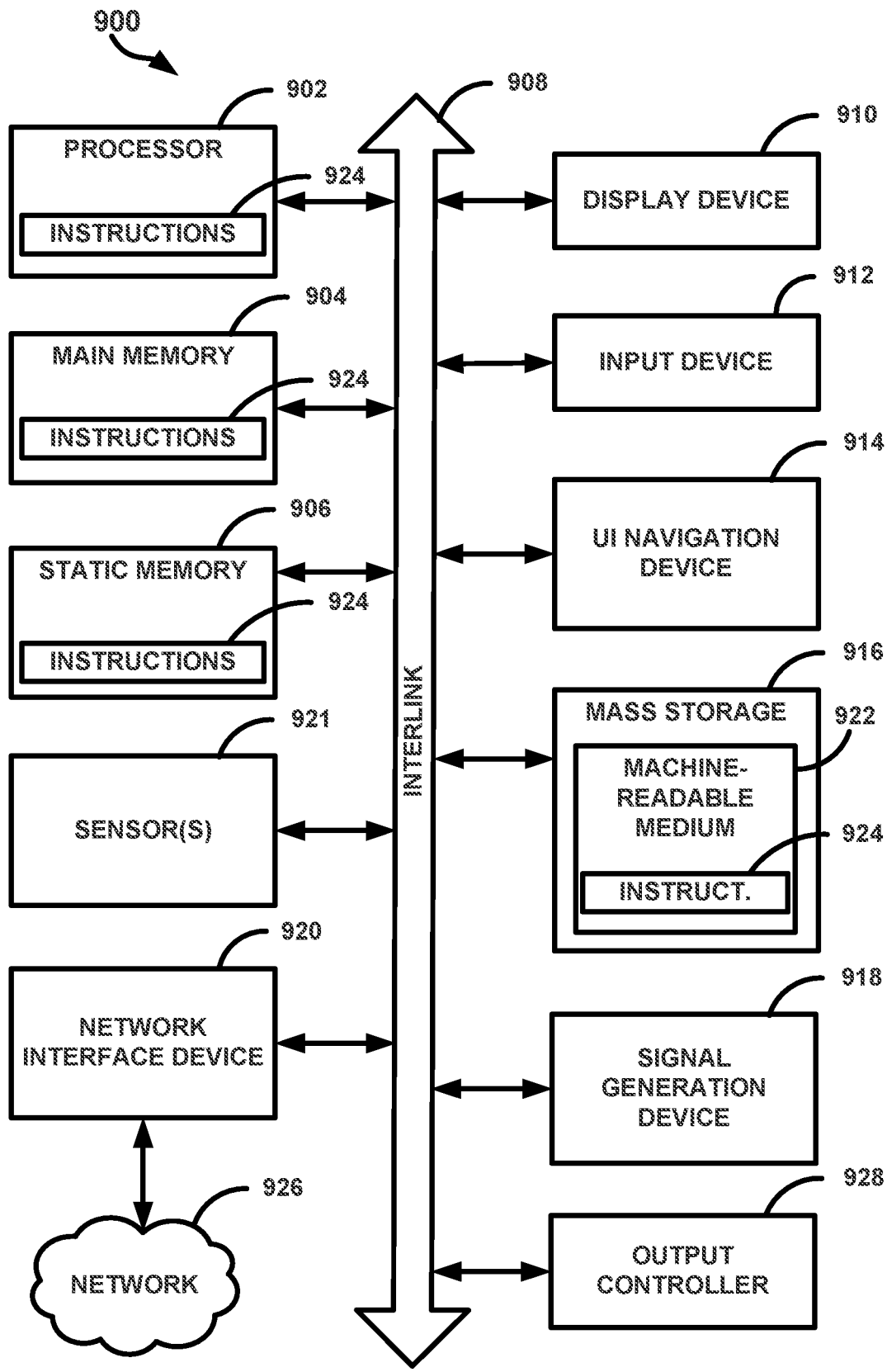
FIG. 9 is a block diagram of an example computer system for performing any one or more methodologies discussed herein, in accord with one or more embodiments.

FIG. 9 shows a diagrammatic representation of a machine in the example form of a computer system 900 within which a set of instructions, for causing the machine to perform any one or more of the methodologies discussed herein, may be executed. At least a portion of the computer system 900 may be included in, for example, any of the device 710, device 712, applications servers 718, API server 714, web server 716, database servers 724, third party server 730, the input module 102, the location determination module 104, the product determination module 106, the output module 112, the rank module 110, the publication engine 802, the selling engine 804, the listing engine 806, the searching engine 808, the navigation engine 810, or the unique product engine 812. In alternative embodiments, the machine operates as a standalone device or may be connected (e.g., networked) to other machines. In a networked deployment, the machine may operate in the capacity of a server or a device machine in server-client network environment, or as a peer machine in a peer-to-peer (or distributed) network environment. The machine may be a server computer, a client computer, a personal computer (PC), a tablet, a set-top box (STB), a Personal Digital Assistant (PDA), a smart phone, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904 and a static memory 906, which communicate with each other using a bus 908. The computer system 900 may further include a video display unit 910 (e.g., liquid crystal display (LCD), organic light emitting diode (OLED), touch screen, or a cathode ray tube (CRT)). The computer system 900 also includes an alpha-numeric input device 912 (e.g., a physical or virtual keyboard), a cursor control device 914 (e.g., a mouse, a touch screen, a touchpad, a trackball, a trackpad), a drive unit 916, a signal generation device 918 (e.g., a speaker), and a network interface device 920.

The drive unit 916 includes a machine-readable medium 922 on which is stored one or more sets of instructions 924 (e.g., software) embodying any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may further be transmitted or received over a network 926 using the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data tangible (e.g., non-transitory) data repositories in the form of a solid-state memory, an optical medium, a magnetic medium, or any suitable combination thereof.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware may generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), non-transitory, or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules may provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and may operate on a resource (e.g., a collection of information).

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The Abstract is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in fewer than all features of a single disclosed embodiment. Thus the following claims are hereby incorporated into the Detailed Description, with each claim standing on its own as a separate embodiment.

What is claimed is:

1. A computer-implemented method comprising:
receiving, by a publication system from a client device, a first location of the client device determined from a wireless communication from the client device;
translating, by a server, a query received via the client device into a format compatible with an items database, the items database storing information regarding items, the information regarding items aggregated from a plurality of databases that each include different information;
executing, by the server, the translated query on the items database;
determining, by the publication system, a plurality of items that are available within a specified distance of the first location and an associated at least one merchant that offers the plurality of items based on the executing of the translated query on the items database;
determining, by the publication system, one or more second locations at which the plurality of items is available based on the one or more second locations including a higher density of merchants offering the plurality of items than one or more other locations within the specified distance of the first location, the one or more second locations not including the one or more other locations; and
presenting, by the publication system to the client device, a map illustrating the location of the client device and merchants at the one or more second locations.

2. The computer-implemented method of claim 1, further comprising:
determining the specified distance based on a radius of a circle originating from the first location.

3. The computer-implemented method of claim 1, further comprising:
determining the specified distance based on a location density of a portion of the geographic region satisfying a threshold location density.

4. The computer-implemented method of claim 1, further comprising:
presenting rating information for at least one merchant of the one or more second locations.

5. The computer-implemented method of claim 1, further comprising:
retrieving shipping information for a user account of the publication system; and
transmitting the shipping information to a merchant located at the one or more second locations for delivery of the at least one item.

6. The computer-implemented method of claim 1, further comprising:
determining a ranking for presenting the one or more second locations and a subset of the plurality of items based on a rating of each merchant of each of the one or more second locations, a rating of each item of the subset of the plurality of items, or a cost of each item of the subset of the plurality of items.

7. The computer-implemented method of claim 6, wherein the ranking is based on the rating of each merchant, the rating of each merchant includes an offline component and an online component, and the offline component is updated upon selling the at least one item.

8. The computer-implemented method of claim 6, wherein the ranking is based on the rating of each item of the subset of the plurality of items.

9. A non-transitory machine-readable medium comprising instructions that, when executed by a machine, configure the machine to perform operations comprising:
receiving, by a publication system from a client device, a first location of the client device determined from a wireless communication from the client device;
translating, by a server, a query received via the client device into a format compatible with an items database, the items database storing information regarding items, the information regarding items aggregated from a plurality of databases that each include different information;
executing, by the server, the translated query on the items database;
determining, by the publication system, a plurality of items that are available within a specified distance of the first location and an associated at least one merchant that offers the plurality of items based on the executing of the translated query on the items database;
determining, by the publication system, one or more second locations at which the plurality of items is available based on the one or more second locations including a higher density of merchants offering the plurality of items than one or more other locations within the specified distance of the first location, the one or more second locations not including the one or more other locations; and
presenting, by the publication system to the client device, a map illustrating the location of the client device and merchants at the one or more second locations.

10. The non-transitory machine-readable medium of claim 9, wherein the operations further comprise:
determining the specified distance based on a radius of a circle originating from the first location.

11. The non-transitory machine-readable medium of claim 9, wherein the operations further comprise:
determining the specified distance based on a location density of a portion of the geographic region satisfying a threshold location density.

12. The non-transitory machine-readable medium of claim 9, wherein the operations further comprise:
presenting rating information for at least one merchant of the one or more second locations.

13. The non-transitory machine-readable medium of claim 9, wherein the operations further comprise:
retrieving shipping information for a user account of the publication system; and
transmitting the shipping information to a merchant located at the one or more second locations for delivery of the at least one item.

14. The non-transitory machine-readable medium of claim 9, wherein the operations further comprise:
determining a ranking for presenting the one or more second locations and a subset of the plurality of items based on a rating of each merchant of each of the one or more second locations, a rating of each item of the subset of the plurality of items, or a cost of each item of the subset of the plurality of items.

15. The non-transitory machine-readable medium of claim 14, wherein the ranking is based on the rating of each merchant, the rating of each merchant includes an offline component and an online component, and the offline component is updated upon selling the at least one item.

16. The non-transitory machine-readable medium of claim 14, wherein the ranking is based on the rating of each item of the subset of the plurality of items.

17. A system comprising:
one or more processors; and
memory including instructions that, when executed by the one or more processors, cause the system to perform operations comprising:
   receiving, by a publication system from a client device, a first location of the client device determined from a wireless communication from the client device;
   translating, by a server, a query received via the client device into a format compatible with an items database, the items database storing information regarding items, the information regarding items aggregated from a plurality of databases that each include different information;
   executing, by the server, the translated query on the items database;
   determining, by the publication system, a plurality of items that are available within a specified distance of the first location and an associated at least one merchant that offers the plurality of items based on the executing of the translated query on the items database;
   determining, by the publication system, one or more second locations at which the plurality of items is available based on the one or more second locations including a higher density of merchants offering the plurality of items than one or more other locations within the specified distance of the first location, the one or more second locations not including the one or more other locations; and
   presenting, by the publication system to the client device, a map illustrating the location of the client device and merchants at the one or more second locations.

18. The system of claim 17, wherein the operations further comprise:
   determining the specified distance based on a radius of a circle originating from the first location.

19. The system of claim 17, wherein the operations further comprise:
   determining the specified distance based on a location density of a portion of the geographic region satisfying a threshold location density.

20. The system of claim 17, wherein the operations further comprise:
   presenting rating information for at least one merchant of the one or more second locations.

* * * * *